US012789375B2

(12) United States Patent
Tian et al.

(10) Patent No.: US 12,789,375 B2
(45) Date of Patent: Nov. 10, 2026

(54) VIEW-INVARIANT POLICY LEARNING VIA ZERO-SHOT NOVEL VIEW SYNTHESIS

(71) Applicant: Toyota Research Institute, Inc., Los Altos, CA (US)

(72) Inventors: Stephen Tian, Stanford, CA (US); Katherine Liu, Mountain View, CA (US); Sergey Zakharov, San Francisco, CA (US); Blake Wulfe, San Francisco, CA (US); Kyle Sargent, Stanford, CA (US); Vitor Campagnolo Guizilini, Santa Clara, CA (US); Jiajun Wu, Stanford, CA (US)

(73) Assignees: ASSIGNEEToyota Research Institute, Inc., Los Altos, CA (US); Toyota Jidosha Kabushiki Kaisha, Toyota (JP); The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 19/226,807

(22) Filed: Jun. 3, 2025

(65) Prior Publication Data

US 2026/0034668 A1 Feb. 5, 2026

Related U.S. Application Data

(60) Provisional application No. 63/677,777, filed on Jul. 31, 2024.

(51) Int. Cl.
*B25J 9/16* (2006.01)
*G06T 11/60* (2026.01)

(52) U.S. Cl.
CPC .......... *B25J 9/1661* (2013.01); *B25J 9/1697* (2013.01); *G06T 11/60* (2013.01)

(58) Field of Classification Search
CPC ...... B25J 9/1661; B25J 9/1697; B25J 9/1671; G06T 11/60
See application file for complete search history.

(56) References Cited

U.S. PATENT DOCUMENTS

| | | | |
|---|---|---|---|
| 8,958,912 | B2 | 2/2015 | Blumberg et al. |
| 2023/0297074 | A1 | 9/2023 | Paxton et al. |
| 2023/0390848 | A1 | 12/2023 | Christy |

FOREIGN PATENT DOCUMENTS

| | | | |
|---|---|---|---|
| CN | 110576446 | B | 3/2023 |
| CN | 117649542 | A | 3/2024 |

OTHER PUBLICATIONS

A. Pashevich, R. Strudel, I. Kalevatykh, I. Laptev and C. Schmid, "Learning to Augment Synthetic Images for Sim2Real Policy Transfer," 2019 IEEE/RSJ International Conference on Intelligent Robots and Systems (IROS), Macau, China, 2019, pp. 2651-2657, doi: 10.1109/IROS40897.2019.8967622. (Year: 2019).*

(Continued)

*Primary Examiner* — Dylan M Katz
(74) *Attorney, Agent, or Firm* — Dinsmore & Shohl LLP

(57) ABSTRACT

The present disclosure provides techniques for robot policy training from view-invariant demonstrations of a task. An example method includes obtaining an image of an environment of the apparatus; generating a plurality of random pose transforms to apply to the image; generating, with a generative diffusion model, respective augmented images of the image based on each of the plurality of random pose transforms, wherein the respective augmented images correspond to augmented views of the environment; selecting a set of the respective augmented images based on a distribution corresponding to a sphere centered at the robot base; and training a robot task diffusion policy with the set of the respective augmented images.

20 Claims, 6 Drawing Sheets

(56) References Cited

OTHER PUBLICATIONS

Tadanobu Inoue, et. al., "Transfer Learning from Synthetic to Real Images Using Variational Autoencoders for Robotic Applications" dated Sep. 20, 2017, retrieved from Internet at https://arxiv.org/pdf/1709.06762 (8 pages).
Kyle Sargent, et. al., "ZeroNVS: Zero-Shot 360-Degree View Synthesis from a Single Real Image" dated Apr. 24, 2024, retrieved from Internet at https://arxiv.org/html/2310.17994v2 (12 pages).
Allan Zhou Stanford, et. al., "NeRF in the Palm of Your Hand: Corrective Augmentation for Robotics via Novel-View Synthesis" dated Jan. 18, 2023, retrieved from Internet at https://arxiv.org/abs/2301.08556 (13 pages).
Danny Driess, et. al., "Reinforcement Learning with Neural Radiance Fields" dated Jun. 3, 2022, retrieved from Internet at https://arxiv.org/abs/2206.01634 (23 pages).
Younggyo Seo, et. al., "Multi-View Masked World Models for Visual Robotic Manipulation" dated May 31, 2023, retrieved from Internet at https://arxiv.org/abs/2302.02408 (20 pages).
Tianhe Yu, et. al., "Scaling Robot Learning with Semantically Imagined Experience" dated Feb. 22, 2023, retrieved from Internet at https://arxiv.org/abs/2302.11550 (21 pages).
Zhao Mandi, et. al., "CACTI: A Framework for Scalable Multi-Task Multi-Scene Visual Imitation Learning" dated Feb. 16, 2023, retrieved from Internet at https://arxiv.org/abs/2212.05711 (14 pages).
Lawrence Yunliang Chen, et. al., "Mirage: Cross-Embodiment Zero-Shot Policy Transfer with Cross-Painting" dated Sep. 9, 2024, retrieved from Internet at https://arxiv.org/abs/2402.19249 (17 pages).
Yunzhu Li, et. al., "3D Neural Scene Representations for Visuomotor Control" dated Nov. 11, 2021, retrieved from Internet at https://arxiv.org/abs/2107.04004 (17 pages).

* cited by examiner

VIEW-INVARIANT POLICY LEARNING VIA ZERO-SHOT NOVEL VIEW SYNTHESIS

CROSS-REFERENCE TO RELATED APPLICATIONS

This application claims the benefit of prior filed U.S. Provisional Patent Application No. 63/677,777 filed on Jul. 31, 2024, which is incorporated herein by reference in its entirety.

TECHNICAL FIELD

The present disclosure generally relates to techniques for robot policy training from view-invariant demonstrations of a task.

BACKGROUND

Foundation models are trained on extensive amounts of data and can be fine-tuned for adaptation to a wide range of downstream tasks. The integration of foundation models into robotics is a rapidly evolving area, and the robotics community has recently started exploring ways to leverage these large models within the robotics domain for perception, prediction, planning, and control. A foundation model for robotic manipulation needs to be able to perform a multitude of tasks, generalizing not only to different environments and goal specifications but also to varying robotic embodiments. A particular robotic system often comes with its own sensor configuration and perception pipeline. This variety can be a challenge for current systems, which are often trained and deployed with carefully controlled or meticulously calibrated perception pipelines. One approach to training models that can scale to diverse tasks as well as perceptual inputs is to train on a common modality, such as third-person RGB images, for which diverse data are relatively plentiful. However, policies learned by such methods may be unable to generalize across perceptual shifts for single RGB images.

Accordingly, a need exists for techniques for robot policy training that can generalize to visual inputs from other camera poses.

SUMMARY

In one aspect, an apparatus includes a processing system that includes one or more processors and one or more memories coupled with the one or more processors. The processing system configured to cause the apparatus to: obtain an image of an environment of the apparatus; generate a plurality of random pose transforms to apply to the image; generate, with a generative diffusion model, respective augmented images of the image based on each of the plurality of random pose transforms, wherein the respective augmented images correspond to augmented views of the environment; select a set of the respective augmented images based on a distribution corresponding to a sphere centered at the robot base; and train a robot task diffusion policy with the set of the respective augmented images.

In some aspects, a method includes obtaining an image of an environment of the apparatus; generating a plurality of random pose transforms to apply to the image; generating, with a generative diffusion model, respective augmented images of the image based on each of the plurality of random pose transforms, wherein the respective augmented images correspond to augmented views of the environment; selecting a set of the respective augmented images based on a distribution corresponding to a sphere centered at the robot base; and training a robot task diffusion policy with the set of the respective augmented images.

In some aspects, a robot system includes one or more cameras; a robotic arm; a processing system that includes one or more processors and one or more memories coupled with the one or more processors, the processing system configured to cause the apparatus to: obtain, from the one or more cameras, image data of an environment around the robot system; and control the robot arm to perform a task based on the robot task diffusion policy processing the image data of the environment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

Figure 1A:
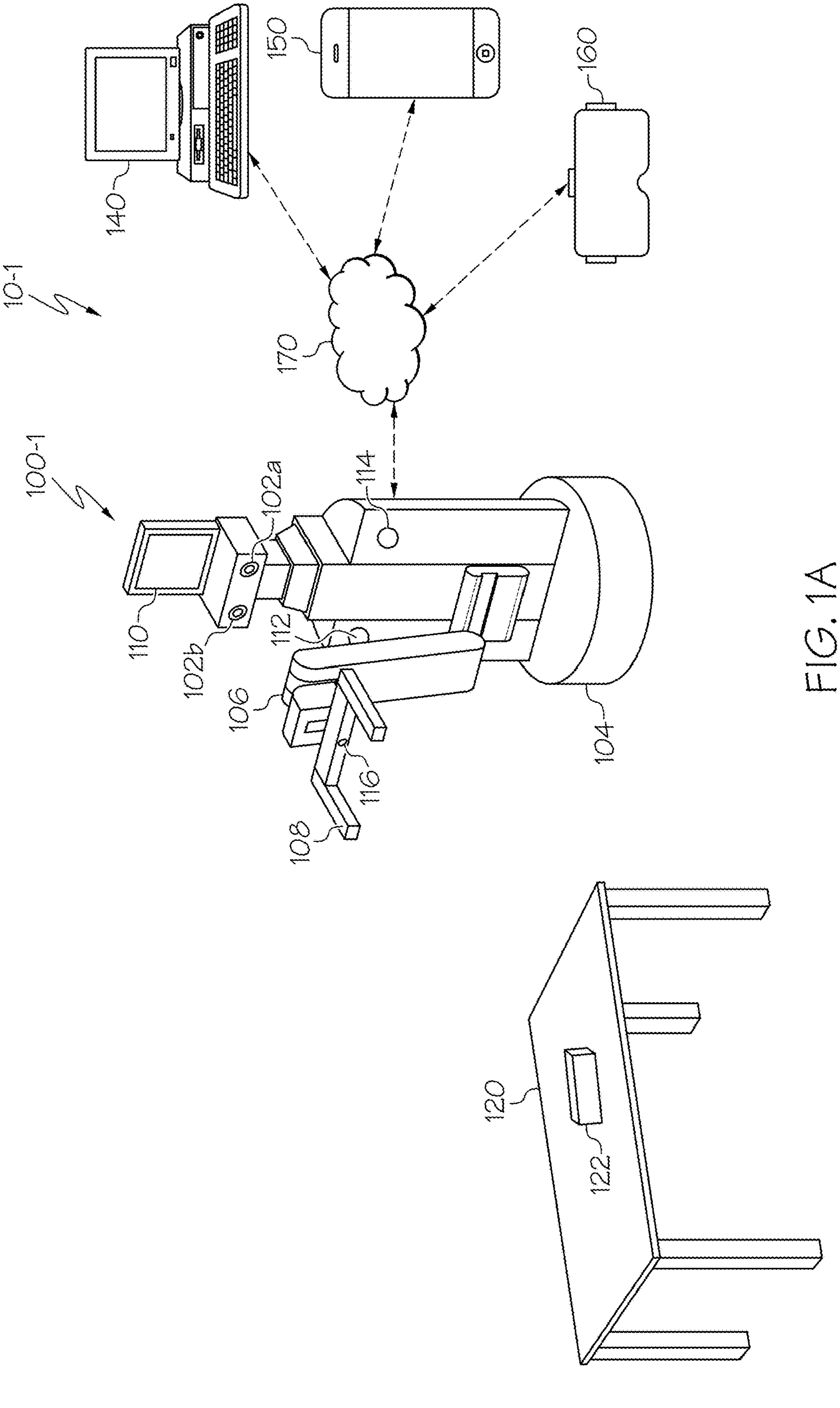
FIG. 1A schematically depicts an example robot system and environment according to one or more embodiments described and illustrated herein.

Aspects of the present disclosure are directed to techniques for robot policy training from view-invariant demonstrations of a task. Aspects of the present disclosure provide technical improvements over existing technology in a variety of ways.

Robotic systems come with a variety of sensor configurations and perception pipelines. This variety can be a challenge for current systems, which are often trained and deployed with carefully controlled or meticulously calibrated perception pipelines. Some current approaches to training models is to train on a common modality, such as third-person RGB images, for which diverse data are relatively plentiful. However, policies learned by such methods may be unable to generalize across perceptual shifts for single RGB images. Accordingly, there is a need for techniques for training robot policies on RGB images collected from various view-points that enables generalization of visual inputs from multiple camera poses.

Existing approaches to learning viewpoint invariance include training using augmented data collected at scale in simulation or physically varying camera poses when collecting large-scale real robot datasets. However, these strategies require resolving the additional challenges of sim-to-real transfer and significant manual human effort, respectively.

The techniques described herein solve the technical issue with training a robot policy to generalize across various view-points, such that learned robot policies are robust to changes in camera pose between training and deployment. In other words, the robot policies that are learned using the techniques described herein are able to be applied to robot systems that may have different camera arrangements and/or obtain image data from view-points that are different from those utilized during training. That is, by performing data augmentation processes described herein, the learned policies are invariant to camera pose. A technical benefit that the technical solutions described herein provide is the ability for robot policies implements by robotic systems to be robust to novel viewpoints, which include viewpoints that may not have been introduced during training.

The technical solutions include leveraging generative models to obtain 3D priors from large-scale data, which may not be related to robotic environments, to make the robot policies more robust to changes in camera pose. In certain aspects, a data augmentation process is utilized to sample views from a 3D-aware image diffusion model at policy training time. By performing training with the augmented views, the policy becomes robust to images from out-of-distribution camera viewpoints. Additionally, this approach has a number of advantages. First, it can leverage large-scale 2D image datasets, which are larger and more diverse than existing robotic interaction datasets with explicit 3D observations. Second, if in-domain robotic data is available, performance may be further improved via finetuning. Third, depth information is not required, nor is camera calibration. Fourth, no limitations are placed on the form of the policy.

Examples discussed herein focus on imitation learning, but this method may be applied to other robotic learning paradigms as well. Furthermore, policy execution time is not negatively impacted, as the techniques described herein do not modify inference time behavior.

Reference now will be made in detail to aspects of the invention, one or more examples of which are illustrated in the drawings. Each example is provided by way of explanation of the invention, not limitation of the invention. In fact, it will be apparent to those skilled in the art that various modifications and variations can be made in the present disclosure without departing from the scope or spirit of the invention. For instance, features illustrated or described as part of one aspect can be used with another aspect to yield a still further aspect. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components. In addition, as used herein, terms of approximation, such as "approximately," "substantially," or "about," refer to being within a ten percent margin of error.

Referring to FIG. 1A, an example robot system and environment 10-1 including a robot 100-1 is schematically depicted. As shown in the illustrated embodiment of FIG. 1A, the robot 100-1 may be a service robot configured to assist humans with various tasks in a residential facility, workplace, school, healthcare facility, manufacturing facility, and/or the like. As a non-limiting example, the robot 100-1 may assist a human with removing object 122 from table 120.

In certain aspects, the robot 100-1 includes image capturing devices 102*a*, 102*b* (collectively referred to as image capturing devices 102 and also referred to herein as image sensors and/or cameras), a locomotion device 104, an arm 106 (also referred to as a robotic arm), a gripping assembly 108, a screen 110, a microphone 112, a speaker 114, and one or more imaging devices 116. It should be understood that the robot 100-1 may include other components. It should also be understood that the aspects described herein are not limited to any specific type of robot, and that the robot 100-1 may have any size, configuration, degrees of freedom, and/or other characteristics.

In some aspects, the image capturing devices 102 may be any device that is configured to obtain image data. As a non-limiting example, the image capturing devices 102 may be digital cameras configured to obtain still images and/or digital video of objects located within the environment 10-1, such as the table 120 and the object 122. Accordingly, a controller (shown below in FIG. 2) may receive the image data and execute various functions based on the image data. Example functions include, but are not limited to, object recognition using image processing algorithms (e.g., a machine learning algorithms or other suitable algorithms) and navigation algorithms for navigating the robot 100-1 within the environment 10-1.

In some aspects, at least one of the image capturing devices 102 may be a standard definition (e.g., 640 pixels×480 pixels) camera. In various embodiments, at least one of the image capturing devices 102 may be a high definition camera (e.g., 1440 pixels×1024 pixels or 1266 pixels×1024 pixels). In some aspects, at least one of the image capturing devices 102 may have a resolution other than 640 pixels×480 pixels, 1440 pixels×1024 pixels, or 1266 pixels×1024 pixels.

In some aspects, the locomotion device 104 may be utilized by the robot 100-1 to maneuver within the environment 10-1. As a non-limiting example, the locomotion device 104 may be a tracked locomotion device. As another non-limiting example and as described below in further detail with reference to FIG. 1B, the robot 100-1 may maneuver within the operating space using one or more wheels. In some aspects, the robot 100-1 may be an unmanned aerial vehicle or an unmanned submersible.

The arm 106 and gripping assembly 108 may be actuated using various mechanisms (e.g., servo motor drives, pneumatic drives, hydraulic drives, electro-active polymer motors, and/or the like) to manipulate items that the robot 100-1 encounters within the environment 10-1. The gripping assembly 108 may be rotatably coupled to the arm 106, and the arm 106 may have, for example, six degrees of freedom. The gripping assembly 108 may include the one or more imaging devices 116, and the view and/or orientation of the one or more imaging devices 116 is configured to rotate in response to a rotation of the gripping assembly 108.

While one arm 106 and one gripping assembly 108 are illustrated, it should be understood that the robot 100-1 may include any number of arms and gripping assemblies in other embodiments. As a non-limiting example and as described below in further detail with reference to FIG. 1B, the robot 100-1 may include two arms.

In some aspects, the screen 110 may display text, graphics, images obtained by the image capturing devices 102, and/or video obtained by the image capturing devices 102. As a non-limiting example, the screen 110 may display text that describes a task that the robot 100-1 is currently executing (e.g., picking up the object 122). In some embodiments, the screen 110 may be a touchscreen display or other suitable display device.

The microphone 112 may record audio signals propagating in the environment 10-1 (e.g., a user's voice). As a non-limiting example, the microphone 112 may be configured to receive audio signals generated by a user (e.g., a user voice command) and transform the acoustic vibrations associated with the audio signals into a speech input signal that is provided to the controller (shown in FIG. 2) for further processing. In some embodiments, the speaker 114 transforms data signals into audible mechanical vibrations and outputs audible sound such that a user proximate to the robot 100-1 may interact with the robot 100-1.

The robot 100-1 may include one or more imaging devices 116 that are configured to obtain depth information of the environment 10-1. The one or more imaging devices 116 may include, but is not limited to, RGB sensors, RGB-D sensors and/or other depth sensors configured to obtain depth information of the environment 10-1. The one or more imaging devices 116 may have any suitable resolution and may be configured to detect radiation in any desirable wavelength band, such as an ultraviolet wavelength band, a near-ultraviolet wavelength band, a visible light wavelength band, a near infrared wavelength band, an infrared wavelength band, and/or the like.

In some embodiments, the robot 100-1 may communicate with at least one of a computing device 140, a mobile device 150, and/or a virtual reality system 160 via network 170 and/or using a wireless communication protocol, as described below in further detail with reference to FIG. 2. As a non-limiting example, the robot 100-1 may capture an image using the image capturing devices 102 and obtain depth information using the one or more imaging devices 116. Subsequently, the robot 100-1 may transmit the image and depth information to the virtual reality system 160 using the wireless communication protocol. In response to receiving the image and depth information, the virtual reality system 160 may display a virtual reality representation of the environment 10-1 (also referred to as a virtual reality environment). As a non-limiting example, the virtual reality representation may indicate the view of the robot 100-1 obtained by the image capturing devices 102, a map of a room or building in which the robot 100-1 is located, the path of the robot 100-1, or a highlight of an object in which the robot 100-1 may interact with (e.g., the object 122).

As another non-limiting example, the computing device 140 and/or the mobile device 150 (e.g., a smartphone, laptop, PDA, and/or the like) may receive the images captured by the image capturing devices 102 and display the images on a respective display. In response to receiving the image and depth information, the computing device 140 and/or the mobile device 150 may also display the virtual reality representation of the environment 10-1.

Figure 1B:
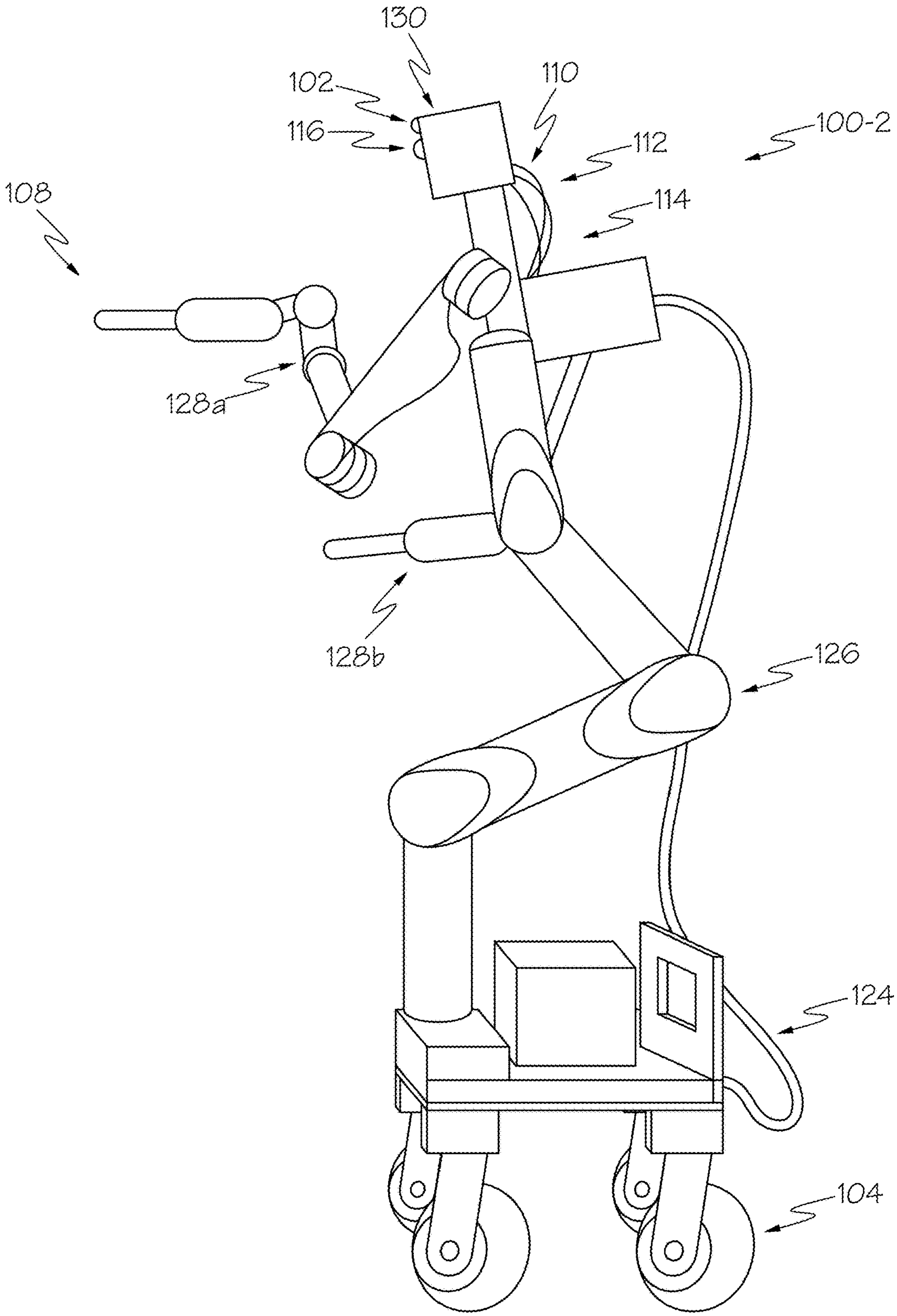
FIG. 1B schematically depicts an example robot according to one or more embodiments described and illustrated herein.

FIG. 1B depicts another example environment 10-2 including robot 100-2. Robot 100-2 is similar to the robot 100-1 described above with reference to FIG. 1A, but in this embodiment, the robot 100-2 includes a chassis portion 124, a torso portion 126, arms 128*a*, 128*b* (collectively referred to as arms 128), and head portion 130.

In some aspects, the chassis portion 124 includes the locomotion device 104. As a non-limiting example, the locomotion device 104 includes four powered wheels that provide the chassis portion 124 eight degrees of freedom, thereby enabling the robot 100-2 to achieve selective maneuverability and positioning within the environment 10-2. Furthermore, the torso portion 126, which is mounted to the chassis portion 124, may include one or more robotic links that provide the torso portion 126, for example, five degrees of freedom, thereby enabling the robot 100-2 to position the torso portion 126 over a wide range of heights and orientations.

In some aspects, the arms 128 may each have many degrees of freedom, for example, seven degrees of freedom, thereby enabling the robot 100-2 to position the arms 128 over a wide range of heights and orientations. Furthermore, each of the arms 128 may include a respective gripping assembly 108, and the arms 128 may be rotatably mounted to the torso portion 126. In some aspects, the head portion 130 of the robot includes the image capturing devices 102, the screen 110, the one or more imaging devices 116, the microphone 112, and the speaker 114.

Figure 2:
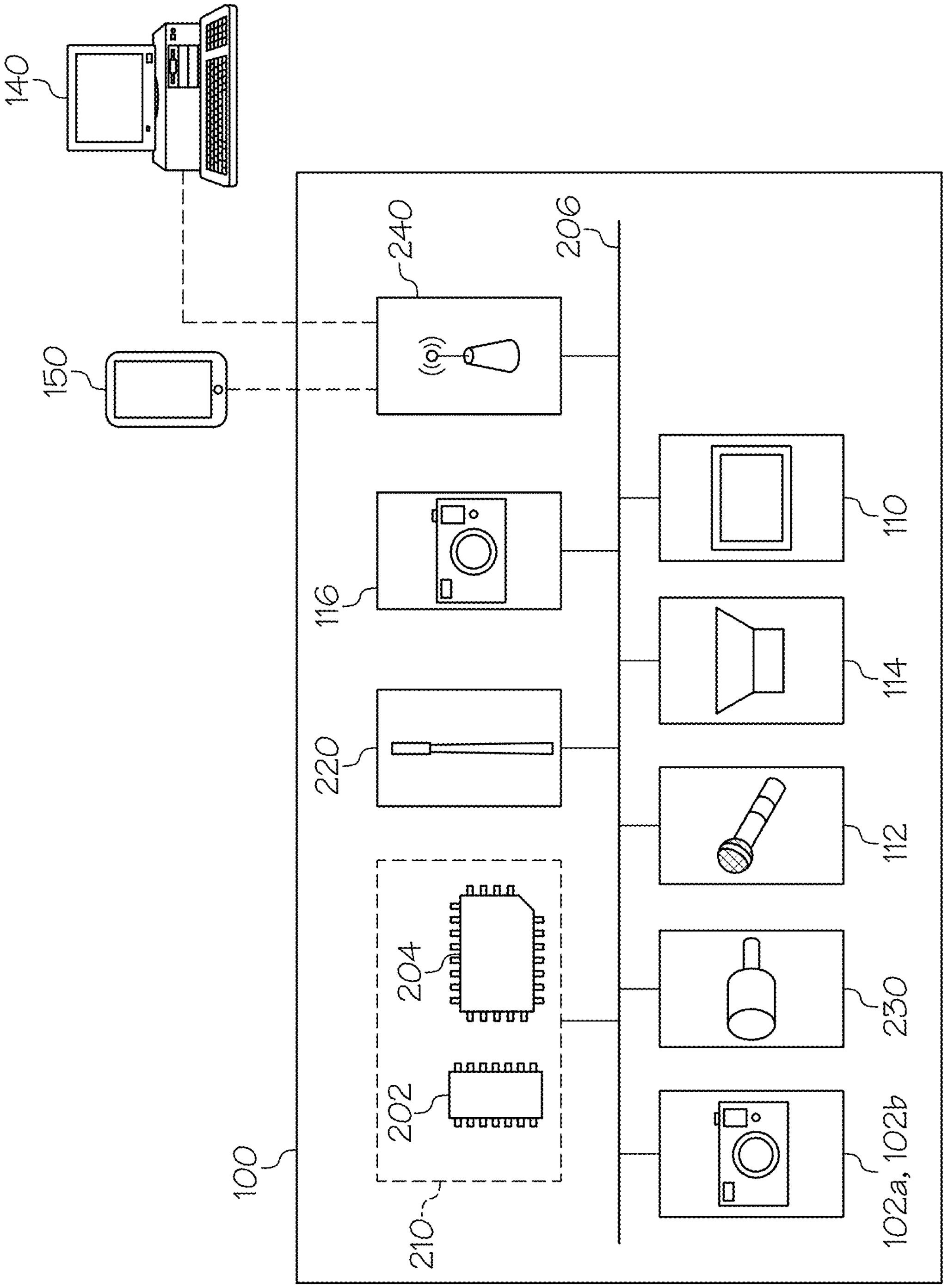
FIG. 2 schematically depicts an illustrative system diagram of an example robot and a virtual reality system according to one or more embodiments described and illustrated herein.

Referring to FIG. 2, various components of robot 100 (e.g., one of robots 100-1, 100-2) are illustrated. The robot 100 includes a controller 210 that includes one or more processors 202 and one or more memory modules 204, the image capturing devices 102*a*, 102*b*, a satellite antenna 220, actuator drive hardware 230, network interface hardware 240, the screen 110, the microphone 112, the speaker 114, and the one or more imaging devices 116. In some embodiments, the one or more processors 202, and the one or more memory modules 204 may be provided in a single integrated circuit (e.g., a system on a chip). In some embodiments, the one or more processors 202, and the one or more memory modules 204 may be provided as separate integrated circuits.

Each of the one or more processors 202 may be configured to communicate with electrically coupled components and may be any commercially available or customized processor suitable for the particular applications that the robot 100 is designed to operate. Furthermore, each of the one or more processors 202 may be any device capable of executing machine readable instructions. Accordingly, each of the one or more processors 202 may be a controller, an integrated circuit, a microchip, a computer, or any other computing device. The one or more processors 202 are coupled to a communication path 206 that provides signal interconnectivity between various modules of the robot 100. The communication path 206 may communicatively couple any number of processors with one another, and allow the modules coupled to the communication path 206 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 206 may be formed from any medium that is capable of transmitting a signal such as, for example, conductive wires, conductive traces, optical waveguides, or the like. Moreover, the communication path 206 may be formed from a combination of mediums capable of transmitting signals. In one embodiment, the communication path 206 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 204 may be coupled to the communication path 206. The one or more memory modules 204 may include a volatile and/or nonvolatile computer-readable storage medium, such as RAM, ROM, flash memories, hard drives, or any medium capable of storing machine readable instructions such that the machine readable instructions can be accessed by the one or more processors 202. The machine readable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, user-oriented programming (OOP), scripting languages, microcode, etc., that may be compiled or assembled into machine readable instructions and stored on the one or more memory modules 204. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 204 may be configured to store one or more modules, each of which includes the set of instructions that, when executed by the one or more processors 202, cause the robot 100 to carry out the functionality of the module described herein. For example, the one or more memory modules 204 may be configured to store a robot operating module, including, but not limited to, the set of instructions that, when executed by the one or more processors 202, cause the robot 100 to carry out general robot operations.

The image capturing devices 102 may be coupled to the communication path 206. The image capturing devices 102 may receive control signals from the one or more processors 202 to acquire image data of a surrounding operating space, and to send the acquired image data to the one or more processors 202 and/or the one or more memory modules 204 for processing and/or storage. The image capturing devices 102 may be directly connected to the one or more memory modules 204. In certain aspects, the image capturing devices 102 include dedicated memory devices (e.g., flash memory) that are accessible to the one or more processors 202 for retrieval.

Likewise, the screen 110, the microphone 112, the speaker 114, and the one or more imaging devices 118 may be coupled to the communication path 206 such that the communication path 206 communicatively couples the screen 110, the microphone 112, the speaker 114, and the one or more imaging devices 118 to other modules of the robot 100. The screen 110, the microphone 112, the speaker 114, and the one or more imaging devices 118 may be directly connected to the one or more memory modules 204. In an alternative embodiment, the screen 110, the microphone 112, the speaker 114, and the one or more imaging devices 118 may include dedicated memory devices that are accessible to the one or more processors 202 for retrieval.

The robot 100 includes a satellite antenna 220 coupled to the communication path 206 such that the communication path 206 communicatively couples the satellite antenna 220 to other modules of the robot 100. The satellite antenna 220 is configured to receive signals from global positioning system satellites. Specifically, in one embodiment, the satellite antenna 220 includes one or more conductive elements that interact with electromagnetic signals transmitted by global positioning system satellites. The received signal is transformed into a data signal indicative of the location (e.g., latitude and longitude) of the satellite antenna 220 or a user positioned near the satellite antenna 220, by the one or more processors 202. In some aspects, the robot 100 may not include the satellite antenna 220.

The actuator drive hardware 230 may comprise the actuators and associated drive electronics to control the locomotion device 104, the arm 106, the gripping assembly 108, and any other external components that may be present in the robot 100. The actuator drive hardware 230 may be configured to receive control signals from the one or more processors 202 and to operate the robot 100 accordingly. The operating parameters and/or gains for the actuator drive hardware 230 may be stored in the one or more memory modules 204.

The robot 100 includes the network interface hardware 240 for communicatively coupling the robot 100 with the computing device 140, the mobile device 150, and/or the virtual reality system 160. The network interface hardware 240 may be coupled to the communication path 206 and may be configured as a wireless communications circuit such that the robot 100 may communicate with external systems and devices. The network interface hardware 240 may include a communication transceiver for sending and/or receiving data according to any wireless communication standard. For example, the network interface hardware 240 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. The network interface hardware 240 includes a Bluetooth transceiver that enables the robot 100 to exchange information with the computing device 140 and/or the mobile device 150 via Bluetooth communication.

Figure 3:
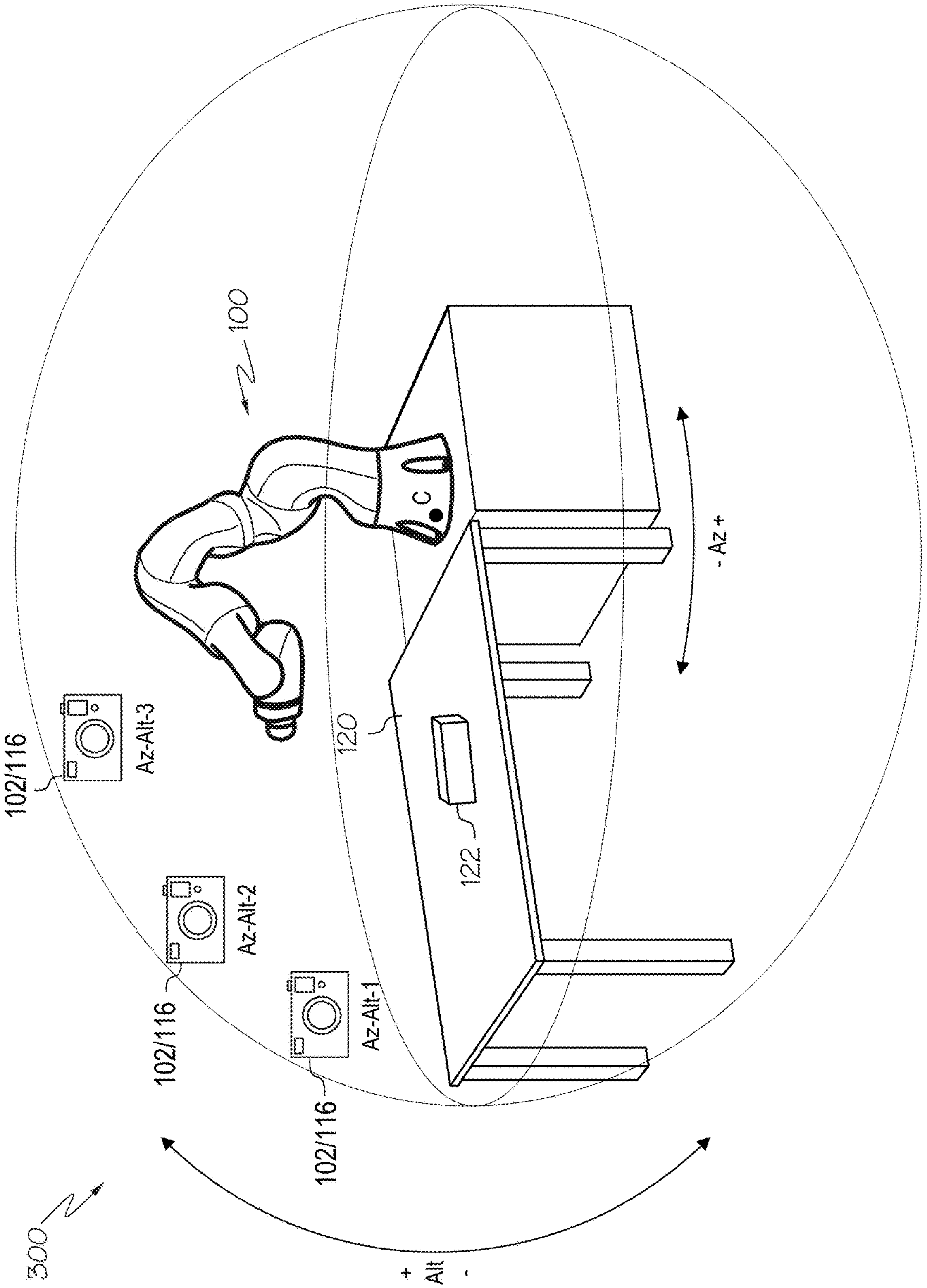
FIG. 3 schematically illustrates an example of a robot system deployed in an environment according to one or more embodiments described and illustrated herein.

FIG. 3 depicts an illustrative example of a robot system 300 deployed in an environment. The robot system 300 includes one or more image capturing devices 102 and/or one or more imaging devices 116 for capturing image data of the environment around and/or including the robot 100. The image data may be utilized for training robot task diffusion policies. Diffusion policies are a kind of Imitation Learning (IL), based on the Denoising Diffusion Probabilistic Models (DDPM). Modeling the policy as a DDPM allows it to capture multiple modes in the action space (i.e., it can account for the different ways a task can be performed as demonstrated by various users). Diffusion policies are based on the Diffusion Model. The diffusion model is a generative model, i.e. a model that can learn the distribution of a dataset and therefore be able to create new data points from this distribution. Diffusion models are inspired by the physical process of diffusion, which describes how particles spread out over time due to random motion. In machine learning, this concept is abstracted into a model that describes a process of gradually adding noise to data until it becomes indistinguishable from random noise.

In certain aspects, a robot system 300 or another apparatus may be configured to carry out one or more training processes that includes capturing image data of a robot performing a task. That is, in certain aspects, the techniques discussed herein can be flexibly applied to many visuomotor policy learning settings. The objective is to learn a policy that solves the task, where observed images are captured by a camera with extrinsics samples from a distribution.

In some aspects, a data augmentation scheme is used for view-invariant policy learning. For example, viewpoint-invariant policies can be learned directly from existing offline datasets, which could be from simulated environments or data collected in the real world. Furthermore, many robotic datasets do not contain the multiview observations or depth images needed for 3D reconstruction. However, using single image novel view synthesis methods to perform augmentation can solve the technical problems associated with current policy training methods.

More specifically, a single-image novel view synthesis model M may be used to replace each frame of a demonstration trajectory with a synthesized frame that includes independently randomly sampled target extrinsics. For the sake of systematic evaluation, in our simulated experiments, we assume knowledge of both the initial camera pose and the target distribution.

This scheme provides several technical benefits. First, while methods that form explicit 3D representations must either use multi-view images or assume static scenes when performing structure-from motion, this approach avoids the computational expense of 3D reconstruction and takes advantage of the fact that a scene is static at any slice in time. Second, it does not add additional computational complexity at inference time, as the trained policy's forward pass remains the same. Lastly, this technique incorporates improvements in the modeling and generalization capability of novel view synthesis models.

In some aspects, the robot system 300 may be configured to include one or more cameras, a robot arm or similar device for control, and a processing system that includes one or more processors and one or more memories coupled with the one or more processors. The processing system configured to cause the apparatus to obtain, from the one or more cameras, image data of an environment around the robot system and control the robot arm to perform a task based on the robot task diffusion policy processing the image data of the environment. The robot task diffusion policy is trained to predict a sequence of actions for receding-horizon control based on the image data.

Figure 4:
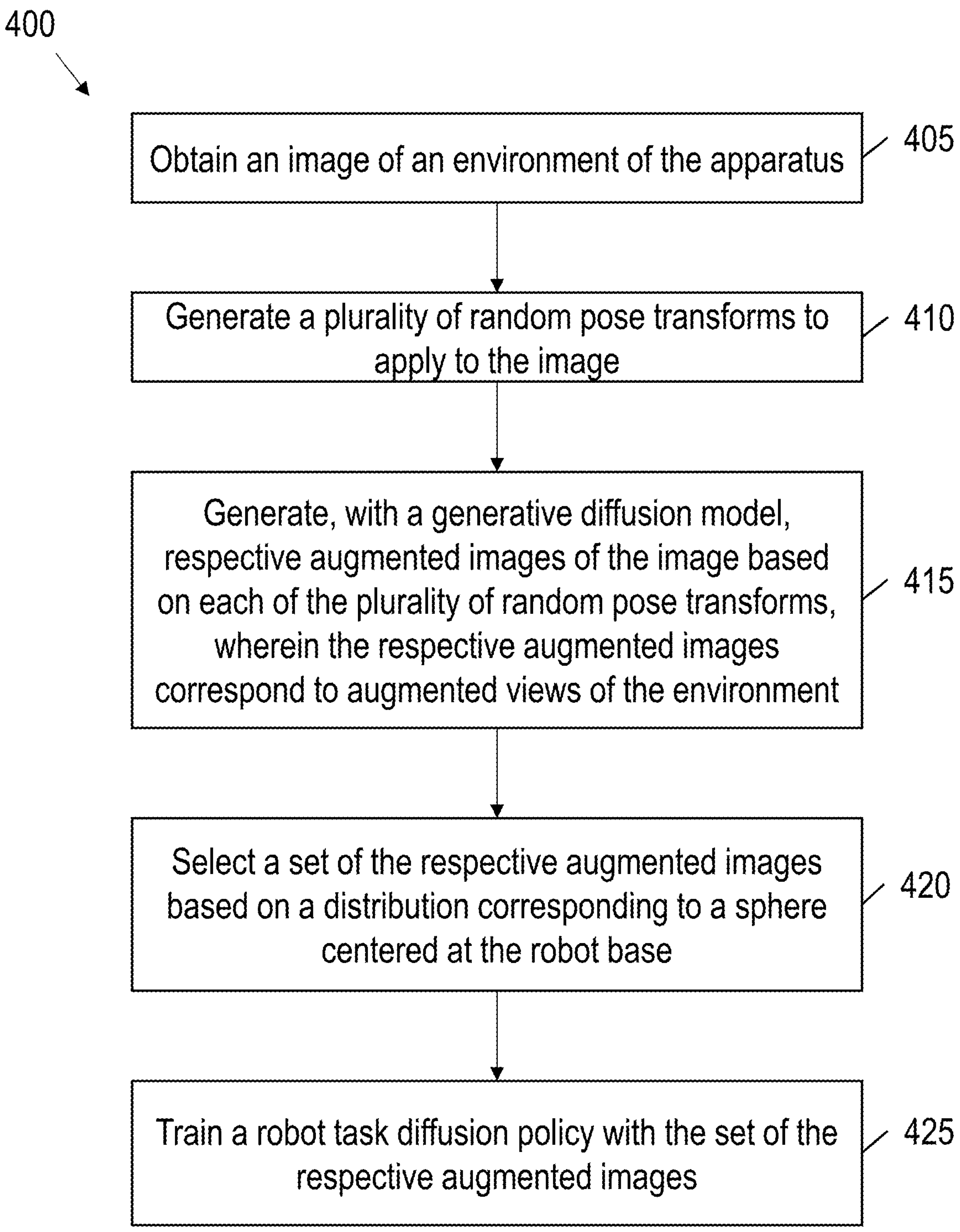
FIG. 4 depicts a flow diagram of an illustrative method for robot policy training according to one or more embodiments described and illustrated herein.

Discussion of FIG. 3 continues with reference to FIG. 4. FIG. 4 depicts a flow diagram of an illustrative method 400 for robot policy training. In some aspects, the method 400 may be performed by an apparatus, such as the controller 210 and/or the computing system 500 of FIG. 5.

The method 400 for robot policy training begins at block 405 with obtaining an image of an environment of the apparatus. The image may be generated by and obtained from the one or more image capturing devices 102 and/or one or more imaging devices 116. In some aspects, the image of the environment is a synthetic image obtained from a simulated environment. The simulated environment may be a computer generated environment where photorealistic images can be generated from one or more poses (e.g., form one or more azimuths and altitudes about the environment). In some aspects, the image of the environment is a real image obtained from an image sensor configured to view the environment from a first pose. For example, as depicted in FIG. 3 cameras may be positioned virtually or in a real environment to capture image data at various azimuth angles (Az) and/or altitude angles (Alt) corresponding to a sphere centered (C) at the robot 100 base. The image data may capture a robot performing a task such that the series of images may be used for training a robot policy to perform the task in different environment or with various robot 100 configurations.

The method 400 continues at block 410 with generating a plurality of random pose transforms to apply to the image. For example, in implementations of the current technique, only one or a few images need to be captured. From the captured images, multiple other viewpoints, referred to as 3D representations or object-centric scenes, can be generated to make the robot policy training invariant to specific viewpoints (e.g., poses). A step in developing the additional viewpoints for training may include generating a plurality of random pose transforms to apply to the image. The random pose transforms may randomly define one or more azimuth angles (Az) and/or altitude angles (Alt) that the initial image pose should be shifted by to create a further image. The randomness may be constrained to one or more ranges such as a quarter arc, half arc, or specific azimuth angle ranges and/or altitude angle ranges.

The method 400 continues at block 415 with generating, with a generative diffusion model, respective augmented images of the image based on each of the plurality of random pose transforms, wherein the respective augmented images correspond to augmented views of the environment. The generative diffusion model may be a Zero-Shot Novel View Synthesis model (ZeroNVS). The ZeroNVS is trained to perform single-image novel view synthesis on image data to generate an object-centric scene.

The method 400 continues at block 420 with selecting a set of the respective augmented images based on a distribution corresponding to a sphere centered at the robot base. The selection of images may be defined to identify one or more poses of the object-centric scene that will be used for training the policy. That is, while an entire or a large portion of a 3D scene representation may be generated by the generative diffusion model, the training techniques described herein do not require that the entire set of images be used for training. For example, some viewpoints (image capture device poses) may not be applicable to robot systems and only a subset of the entire set of viewpoints may be needed to enable the variations in viewpoints that the robot system may be configured to operate in. For example, certain viewpoints may not be implemented by a robot system, so those viewpoints may not be needed for training the robot policy. Accordingly, the distribution may define, through an azimuth angle range and an altitude angle range corresponding to the sphere centered at the robot base, the set of the respective augmented images to use for training. In some aspects, the azimuth angle range is 0-360 degrees, 0-270 degrees, 0-180 degrees, 0-90 degrees, about 30 degrees, about 60 degrees, about 90 degrees, about 180 degrees, about 270 degrees, or any range from 0-360 degrees. In some aspects, the altitude angle range is 0-360 degrees, 0-270 degrees, 0-180 degrees, 0-90 degrees, about 30 degrees, about 60 degrees, about 90 degrees, about 180 degrees, about 270 degrees, or any range from 0-360 degrees.

The method 400 continues at block 425 with training a robot task diffusion policy with the set of the respective augmented images. In certain aspects, the training process may be carried out until a convergence is achieved or a loss function is minimized. The training process may output, through the policy network, a Gaussian mixture model.

The method 400 can be repeated one or more times using different image data and or at different stages of a robot carrying out a task to that the entire task can be learned by the robot policy and become robust to viewpoints when implemented on various robot configurations (including those that are structurally different from the robot system utilized for training).

The functional blocks and/or flow diagram elements described herein may be translated into machine-readable instructions or as a computer program product, which when executed by a computing device, causes the computing device to carry out the functions of the blocks. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Figure 5:
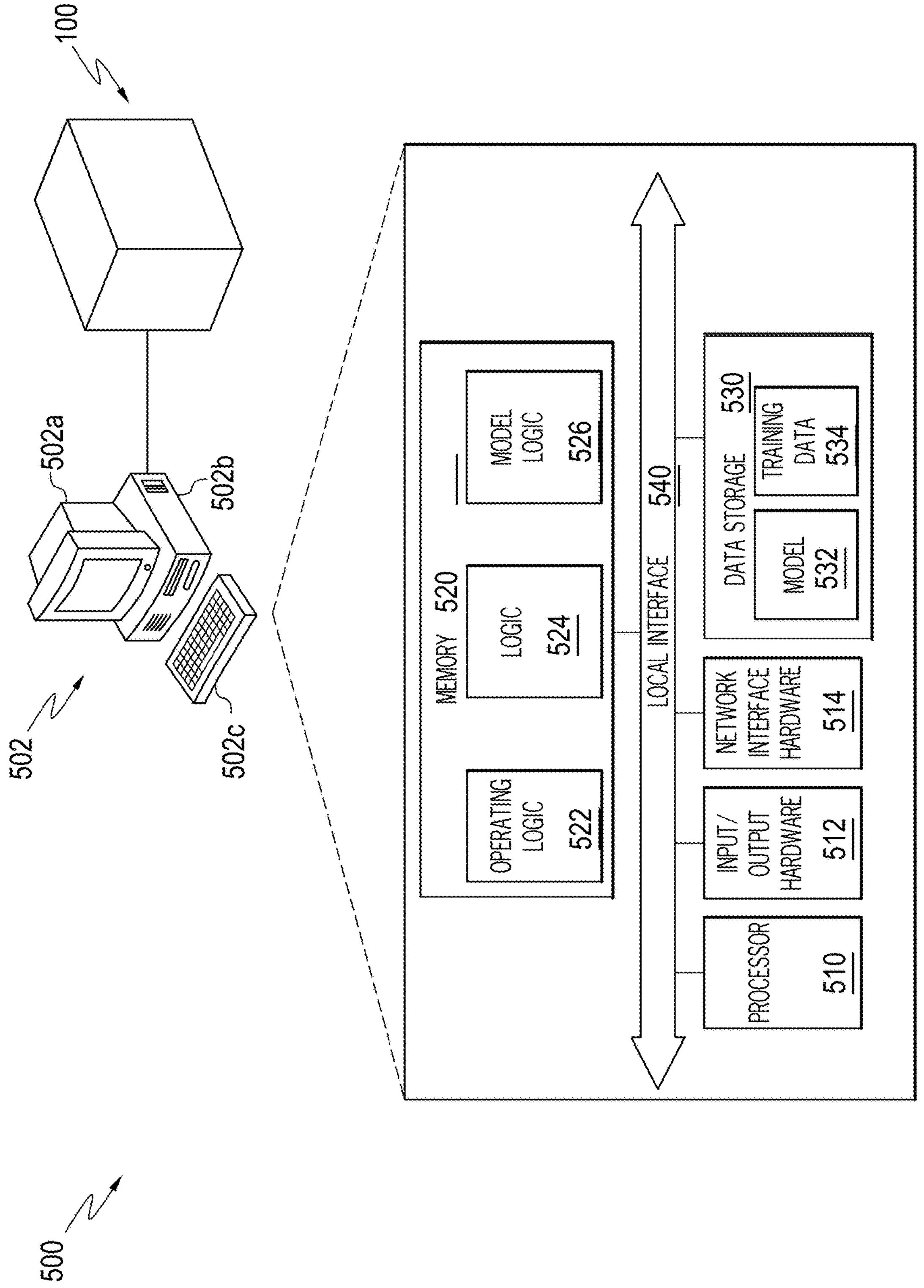
FIG. 5 depicts an illustrative system for implementing the methods for robot policy training according to one or more embodiments described and illustrated herein.

Referring now to FIG. 5, the computing system 500 may be deployed over a network. The network may include a wide area network, such as the internet, a local area network (LAN), a mobile communications network, a public service telephone network (PSTN) and/or other network. The network may be configured to electronically and/or communicatively connect a computing device 502 and a robot, such as the robot 100-1, robot 100-2, or robot system 300 depicted and described with reference to FIGS. 1-3.

The computing device 502 may include a display 502*a*, a processing unit 502*b* and an input device 502*c*, each of which may be communicatively coupled together and/or to the network. The computing device 502 may be a server, a personal computer, a laptop, a tablet, a smartphone, a handheld device, or the like. The computing device 502 may be used by a user of the system to provide information to the system. The computing device 502 may utilize a local application or a web application to access the robot. The system may also include one or more data servers having one or more databases from which information may be queried, extracted, updated, and/or utilized by the computing device 502 and/or the robot.

It is also understood that while the computing device 502 is depicted as a personal computer, however, this is merely an example. In some aspects, any type of computing device (e.g., mobile computing device, personal computer, server, and the like) may be utilized for any of these components.

As illustrated in FIG. 5, the computing device 502 includes a processor 510, input/output hardware 512, network interface hardware 514, a data storage component 530, and a memory module 520. The memory module 520 may be machine readable memory (which may also be referred to as a non-transitory processor readable memory). The memory module 520 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory module 520 may be configured to store operating logic 522, a logic 524 (e.g., logic enabling method 400 depicted in FIG. 4 or robot task diffusion policies that are learned through the techniques described herein), and model logic 526 (e.g., logic enabling the models described herein, such as the generative diffusion model (e.g., ZeroNVS) and/or the robot task diffusion policy), each of which may be embodied as a computer program, firmware, or hardware, as an example. A local interface 540 is also included in FIG. 5 and may be implemented as a bus or other interface to facilitate communication among the components of the computing device 502.

The processor 510 may include any processing component(s) configured to receive and execute programming instructions (such as from the data storage component 530 and/or the memory module 520). The instructions may be in the form of a machine-readable instruction set stored in the data storage component 530 and/or the memory module 520. The input/output hardware 512 may include a monitor, keyboard, mouse, printer, camera, microphone, speaker, and/or other device for receiving, sending, and/or presenting data. The network interface hardware 514 may include any wired or wireless networking hardware, such as a modem, LAN port, Wi-Fi card, WiMax card, mobile communications hardware, and/or other hardware for communicating with other networks and/or devices.

It should be understood that the data storage component 530 may reside local to or remote from the computing device 502 and may be configured to store one or more pieces of data for access by the computing device 502 and/or other components. As illustrated in FIG. 5, the data storage component 530 may store simulated environment models and/or image data 532, training data 534 for training the models (e.g., the robot task diffusion policies), and other data for enabling the techniques described herein.

It should now be understood that embodiments of the present disclosure are directed to techniques for robot policy training from view-invariant demonstrations of a task.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus, comprising: a processing system that includes one or more processors and one or more memories coupled with the one or more processors, the processing system configured to cause the apparatus to:

obtain an image of an environment of the apparatus;

generate a plurality of random pose transforms to apply to the image;

generate, with a generative diffusion model, respective augmented images of the image based on each of the plurality of random pose transforms, wherein the respective augmented images correspond to augmented views of the environment;

select a set of the respective augmented images based on a distribution corresponding to a sphere centered at a robot base; and train a robot task diffusion policy with the set of the respective augmented images.

2. The apparatus of claim 1, wherein the processing system is configured to cause the apparatus to:

obtain a second image of the environment of the apparatus;

generate a second plurality of random pose transforms to apply to the second image;

generate, with the generative diffusion model, respective second augmented images of the second image based on each of the second plurality of random pose transforms, wherein the respective second augmented images correspond to augmented views of the environment;

select a second set of the respective second augmented images based on a second distribution corresponding to the sphere centered at the robot base; and execute additional training of the robot task diffusion policy with the second set of the respective augmented images.

3. The apparatus of claim 1, wherein the generative diffusion model is a Zero-Shot Novel View Synthesis model (ZeroNVS) trained to perform single-image novel view synthesis on image data to generate an object-centric scene.

4. The apparatus of claim 1, wherein the robot task diffusion policy is trained to predict a sequence of actions for receding-horizon control based on the respective augmented images.

5. The apparatus of claim 1, wherein the image of the environment is a synthetic image obtained from a simulated environment.

6. The apparatus of claim 1, wherein the image of the environment is a real image obtained from an image sensor configured to view the environment from a first pose.

7. The apparatus of claim 1, wherein the distribution defines an azimuth angle range and an altitude angle range corresponding to the sphere centered at the robot base.

8. The apparatus of claim 7, wherein the azimuth angle range is about 90 degrees.

9. The apparatus of claim 7, wherein the altitude angle range is about 90 degrees.

10. A method, comprising:

obtaining an image of an environment of a robot;

generating a plurality of random pose transforms to apply to the image;

generating, with a generative diffusion model, respective augmented images of the image based on each of the plurality of random pose transforms, wherein the respective augmented images correspond to augmented views of the environment;

selecting a set of the respective augmented images based on a distribution corresponding to a sphere centered at a robot base; and training a robot task diffusion policy with the set of the respective augmented images.

11. The method of claim 10, further comprising:

obtaining a second image of the environment of the robot;

generating a second plurality of random pose transforms to apply to the second image;

generating, with the generative diffusion model, respective second augmented images of the second image based on each of the second plurality of random pose transforms, wherein the respective second augmented images correspond to augmented views of the environment;

selecting a second set of the respective second augmented images based on a second distribution corresponding to the sphere centered at the robot base; and executing additional training of the robot task diffusion policy with the second set of the respective augmented images.

12. The method of claim 10, wherein the generative diffusion model is a Zero-Shot Novel View Synthesis model (ZeroNVS) trained to perform single-image novel view synthesis on image data to generate an object-centric scene.

13. The method of claim 10, wherein the robot task diffusion policy is trained to predict a sequence of actions for receding-horizon control based on the respective augmented images.

14. The method of claim 10, wherein the image of the environment is a synthetic image obtained from a simulated environment.

15. The method of claim 10, wherein the image of the environment is a real image obtained from an image sensor configured to view the environment from a first pose.

16. The method of claim 10, wherein the distribution defines an azimuth angle range and an altitude angle range corresponding to the sphere centered at the robot base.

17. The method of claim 16, wherein the azimuth angle range is about 90 degrees.

18. The method of claim 16, wherein the altitude angle range is about 90 degrees.

19. A robot system, comprising:

one or more cameras;

a robotic arm; and a processing system that includes one or more processors and one or more memories coupled with the one or more processors, the processing system configured to:

obtain, from the one or more cameras, image data of an environment around the robot system; and control the robotic arm to perform a task based on a robot task diffusion policy processing the image data of the environment, wherein the robot task diffusion policy is trained using the method of claim 10.

20. The robot system of claim 19, wherein the robot task diffusion policy is trained to predict a sequence of actions for receding-horizon control based on the image data.

* * * * *